Figures 1, 3:
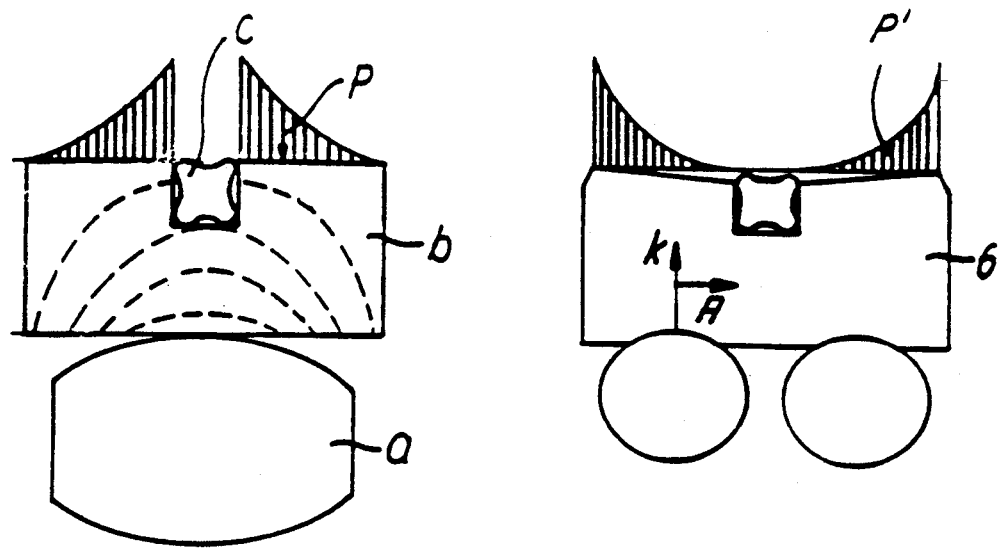

United States Patent
Høm et al.

Patent Number: 5,156,410
Date of Patent: Oct. 20, 1992

[54] COMBINATION SEAL FOR SEALING BETWEEN TWO MACHINE PARTS

[75] Inventors: Jørgen Høm, Holte, Denmark; Roy Edlund, Stuttgart-Bothang, Fed. Rep. of Germany

[73] Assignees: W.S. Shamban Europa A/S (W.S. Shamban & Company A/S), Fabriksvej, Denmark; Busak+Luyken GmbH & Co., Stuttgart, Fed. Rep. of Germany

[21] Appl. No.: 623,816
[22] PCT Filed: Jul. 7, 1988
[86] PCT No.: PCT/DK88/00113
§ 371 Date: Jan. 4, 1991
§ 102(e) Date: Jan. 4, 1991
[87] PCT Pub. No.: WO90/00693
PCT Pub. Date: Jan. 25, 1990
[51] Int. Cl.$^5$ .............................................. F16J 15/16
[52] U.S. Cl. ............................ 277/165; 277/169; 277/177; 277/206 A; 277/208
[58] Field of Search .............. 277/165, 169, 177, 195, 277/198, 206 R, 206 A, 188 A, 207 R, 208

[56] References Cited

U.S. PATENT DOCUMENTS

| | | | |
|---|---|---|---|
| 2,825,590 | 3/1958 | Sutherland | 277/165 |
| 2,889,183 | 6/1959 | Peras | 277/169 |
| 2,895,772 | 7/1959 | Chapman et al. | 277/165 |
| 3,663,024 | 5/1972 | Traub . | |
| 3,942,806 | 3/1976 | Edlund | 277/227 X |
| 4,179,131 | 12/1979 | Nussbaumer | 277/165 |
| 4,449,718 | 5/1984 | Müller | 277/165 X |
| 4,582,330 | 4/1986 | Lew et al. | 277/206 A |
| 4,614,348 | 9/1986 | Fournier | 277/165 X |
| 4,702,482 | 10/1987 | Oseman | 277/165 |
| 4,709,932 | 12/1987 | Edlund et al. | 277/165 |
| 4,714,259 | 12/1987 | Mack et al. | 277/165 |
| 4,819,952 | 4/1989 | Edlund | 277/165 |
| 4,953,876 | 9/1990 | Müller | 277/165 |

FOREIGN PATENT DOCUMENTS

| | | |
|---|---|---|
| 146050 | 11/1977 | Denmark . |
| 0277484 | 1/1988 | European Pat. Off. . |
| 2829030A1 | 7/1978 | Fed. Rep. of Germany . |
| 3521525C1 | 6/1985 | Fed. Rep. of Germany . |
| 3418898 | 11/1985 | Fed. Rep. of Germany ...... 277/165 |
| 3613880C1 | 4/1986 | Fed. Rep. of Germany . |
| 3606886 | 9/1987 | Fed. Rep. of Germany ...... 277/165 |
| 65655 | 12/1977 | Finland . |
| 2177464A | 3/1987 | United Kingdom . |

OTHER PUBLICATIONS

"Seals and Sealing Handbook": by R. H. Warring, pp. 220, 221, Gulf Publ. Co., priority date Jul. 1, 1986.
Abstract entitled "Pump or compressor piston seal—has radial thrust rings of material with lower expansion coeffficient than self-lubricating seal rings", 1987 Derwent Publications Ltd.

*Primary Examiner*—William A. Cuchlinski, Jr.
*Assistant Examiner*—Scott W. Cummings
*Attorney, Agent, or Firm*—Wegner, Cantor, Mueller & Player

[57] ABSTRACT

For sealing between two opposed surfaces of two machine elements (1, 2) a combination seal is provided to be fitted into an open groove (3) in one of the machine elements (2). The seal comprises an electomeric expansion ring (4, 5) at the bottom of the groove (3), an intermediate ring (6) made of a viscous-elastic material, e.g. PTFE and having a sealing surface (6b) to contact the mating machine element (2), and an elastomeric outer ring (8) fitted into a separate groove (7) in the sealing surface (6b) of the intermediate ring. Especially in cases where the seal is to separate fluid and gas an improved distribution of the contact pressure at the sealing surface (6b) and also an effective hydrodynamic relief of the outer ring (8) preventing its exposure to injurious pressures and subsequent damage is obtained by designing the intermediate ring (6) at the ends of the sealing surface (6b) with comparatively sharp corners (16, 17), the parts of the sealing surface between these corners and the separate groove (7) forming conical faces (14, 15) which at a narrow slit angle converge towards the separate groove (7). The intermediate ring may also be biassed by the two expansion rings (4, 5) placed on each side of the separate groove (7).

4 Claims, 1 Drawing Sheet

(PRIOR ART)

COMBINATION SEAL FOR SEALING BETWEEN TWO MACHINE PARTS

This invention relates to a combination seal for sealing between closely opposing surfaces of two machine elements, one of which has an open groove facing the other machine element, said groove having preferably a rectangular cross section, said seal comprising an expansion ring of an elastomeric material and designed to be positioned against the bottom of said groove, an intermediate sealing ring of a viscous-elastic synthetic material engaged by the expansion ring and shaped with a sealing surface for contact with the other machine element, and an outer ring of an elastomeric material and fitted into a separate groove on the sealing surface of the intermediate ring.

Such seals are known from the DK published patent specification No. 146050 and are especially used as piston seals or rod seals between mating cylindrical surfaces of two mutually mobile machine elements, e.g. a hydraulic cylinder and its working piston or a solid end wall of a cylinder and a piston rod piercing it. They are effective to provide efficient sealing for fluids as well as gases within a wide pressure range, e.g. for pressure differences varying from 0 to 500 bar. The intermediate ring that is biased by the elastomeric expansion ring may consist of polytetrafluoroethylene or of some other highly temperature-resistant synthetic material with a high elasticity modulus and low friction, provides an efficient dynamic sealing at relatively big pressure differences, whereas the elastomeric outer ring at the sealing surface of the intermediate ring assures an effective sealing even at minor pressure differences between the two sides of the seal.

The object of the invention is to widen the range of application of seals of the said type and provide an improvement of the known combination seal suitable in particular for gaseous fluids, e.g. to be applied in gas accumulators and heavily loaded shock absorbers.

In such cases, where combination seals of the said type often have to separate liquid and gas, it has proved difficult to get a sufficiently effective seal for both media. This is mainly due to the fact that during a working stroke a thin liquid film may pass from the high pressure side onto the outer ring fitted into the sealing surface of the intermediate ring. When subjected to heavy loads the prior art seals have not always been able to cause this liquid film to flow back during the return stroke. This can lead to a build-up of a liquid pressure depending on the working speed and may lead to a mechanical deformation of the sealing ring, whereby the outer ring is subjected to a damage risk through socalled "ribbling", i.e. cutting of material from the ring which under dynamic conditions performs pulsating movements. Thereby the sealing efficiency of the outer ring is impaired, and especially at high relative movements the sealing between the two machine elements may become deficient. This will often entail a need to supplement the known seal with additional seals specifically designed to counteract this drawback.

The invention solves this problem by means of a double acting combination seal, characterised in that the intermediate ring is designed with relatively sharp corners between the sealing surface and its end faces the parts of the sealing surface between each of said corners and said separate groove forming conical faces converging against the groove at a narrow slit angle.

With this design the seal an optimum pressure distribution over the sealing surface is obtained with a very narrow, nearly linear contact face and thus a maximum contact pressure at said corners which thus function as a kind of scraper edges.

At the same time the narrow slit angle entails for both of the said conical faces that a fluid film which during a working stroke may flow as a leakage flow to the outer ring is returned to the high pressure side during the return stroke, essentially in the same manner as it is known per se from DK patent No. 143667. Thereby one achieves an efficient hydrodynamic relief of the outer ring, ensuring that it is not even at high working speeds exposed to damaging pressure influences.

In a preferred embodiment the sealing ring is provided with bevelled conical annular faces at said corners, resulting in an improved safety against undesired dislocations of material during installation of the seal. This is to say, that twisting and/or extrusion of the outer ring is substantially avoided, as it is known per se from Danish patent application No. 5806/83.

The slit angle at parts of the sealing surface of the intermediate ring forming conical faces is preferably to be narrow, as this provides better hydrodynamic return forces. Practical experiments have proved that a slit angle of 1° to 5° is suitable.

From GB-A-2177464 it is known per se to form the sealing surface of a PTFE sealing ring with an intermediate circumferentially landed portion between two axially spaced apart circumferential lip portions forming in the unstressed condition of the sealing ring an angle of 20° with the surface to be sealed.

In the following the invention is given a more detailed explanation with reference to the schematic drawings, where FIG. 1 illustrates the construction and operation of a known combination seal.

Figure 2:
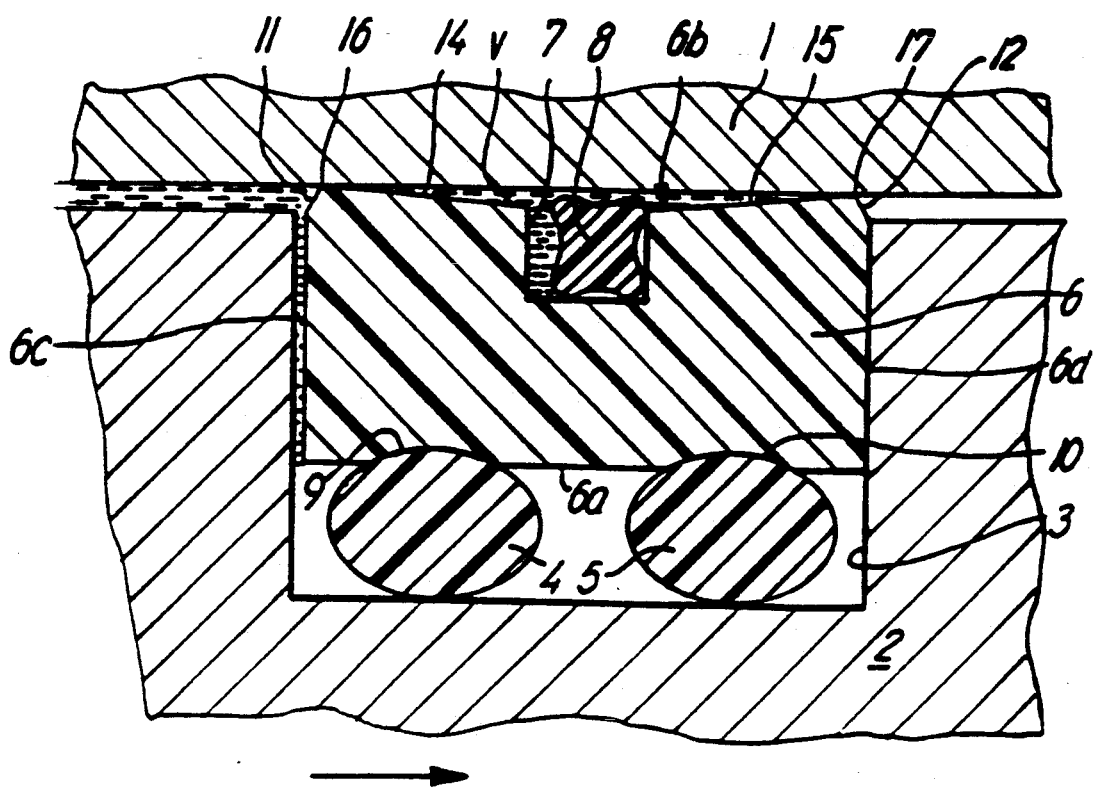

FIG. 2 is an axial section at view of part of an embodiment of a combination seal according to the invention applied as piston seal, and FIG. 3 illustrates the mode of operation of the seal in FIG. 2.

In the seal in FIG. 1, that is merely shown schematically, and which is of the type known from published DK patent specification No. 146050, the intermediate ring b which preferably is made of polytetrafluoroethylene, is biased by the elastomeric expansion ring a with pressure forces which in the intermediate ring b may cause a distribution of stress as shown by the dotted curves s, whereby the distribution of the contact pressure over the sealing surface of the intermediate ring b on each side of the outer ring c will be mainly as shown by the pressure distribution curves P, i.e. with a maximum contact pressure on the central part of the sealing surface at the edges of the separate groove wherein the outer ring c is fitted.

This pressure distribution prevents the return of a liquid film which during a working stroke is carried to the outer ring c, to the high pressure side during the return stroke, and as a result a fluid pressure may be built up around the outer ring c entailing injury to the outer ring and consequently rendering the sealing deficient, especially at high working speeds.

In the embodiment shown in FIG. 2 of a seal according to the invention, 1 designates the wall of a working cylinder, e.g. in a gas accumulator or a highly loaded shock absorber, whereas 2 indicates a piston that is mobile with a clearance relative to the cylindrical inner side of the wall 1. In the outer side of the piston a groove 3 is provided to receive the seal according to the invention.

The combination seal comprises two juxtaposed expansion rings 4 and 5 of an elastomeric material, e.g. rubber or polyurethan, positioned against the bottom of the groove 3, an intermediate ring 6 of a viscous-elastic, deformable synthetic material e.g. PTFE virgin or modified with fillers known per se, this intermediate ring being biased by the expansion rings 4 and 5, as well as an outer ring 8 positioned in a separate groove 7 in the intermediate ring 6 at the sealing surface 6b facing the machine element 2. The outer ring 8 may consist of the same elastomeric material as the expansion rings 4 and 5.

The expansion rings 4 and 5 which individually engage grooves 9 and 10 on the bearing surface 6a of the intermediate ring 6, can be produced as O-rings with an oval cross section, whereas the elastomeric outer ring 8 preferably has a mainly rectangular cross section with projecting corners causing a secure positioning and retention of the outer ring 8 in the groove 7.

According to the invention the intermediate ring 6 is provided at the ends of the sealing surface 6a with relatively sharp corners 16 and 17, at which in the illustrated, preferred embodiment bevelled, conical faces 11 and 12 have been formed. Furthermore the parts of the sealing surface 6b between each of the annular planes 11 and 12 and the separate groove 7 form conical faces 14 and 15 which converge towards the groove 7 leaving a narrow slit angle v in relation to the mating surface of the machine element 2.

With a seal according to the invention the expansion rings 4 and 5 act upon the intermediate ring 6 with forces K acting at a distance A on each side of the groove 7, as shown on FIG. 3. The parts of the intermediate ring 6 placed on each side of the groove 7, are hereby influenced by the moments k A with axes at the corners between the bottom of the groove 7 and the side walls. Thereby a distribution of the contact pressure is obtained along the sealing surface 6a as shown by the curves P' with maxima at the relatively sharp-edged corners 16 and 17 between the annular surfaces 11, 12, and the conical surfaces 14, 15.

These corners 16 and 17 will therefore function as scraper edges. When the machine element 2 moves in the direction shown by the arrow in FIG. 2, a leakage stream of the liquid in question will flow from the high pressure side that in FIG. 2 is situated to the left of the seal against the groove 7 and the outer ring 8 which is thereby pressed against the opposite side wall of the groove 7. During this movement the expansion ring 4 causes a reduction of the slit angle v at the conical face 14 to nearly 0°.

During the return stroke against the arrow in FIG. 2 the liquid build-up in the groove 7 will be returned to the high pressure side due to the pressure distribution P' shown in FIG. 3 as the slit due to the narrow slit angle v is opened somewhat. In this way an injurious pressure build-up in the groove 7 can be completely avoided.

The above described specific embodiment does not limit neither the design nor the applications of the combination seal according to the invention. In general the combination seal is suited for the same range of applications as the known seal according to the above mentioned DK patent No. 146050 and entails in particular a considerably improved seal with a reduced leakage rate at high working speeds between two machine elements.

We claim:

1. A combination seal for sealing between closely opposing surfaces of two machine elements, one of the machine elements having an open groove with a rectangular cross-section facing the other machine element, said seal comprising:

a pair of expansion rings formed of an elastomeric material, said expansion rings being positionable against the bottom of said open groove;

an intermediate sealing ring formed of a viscous-elastic synthetic material engaged by said expansion rings, said intermediate sealing ring having
   a) a bearing surface having two bearing surface grooves for receiving said expansion rings therein,
   b) a pair of end faces, and
   c) a sealing surface adapted to contact the other machine element, said sealing surface having a separate groove disposed between said bearing surface grooves, wherein said intermediate ring has sharp corners disposed between the sealing surface and the end faces, and wherein portions of the sealing surface between each of said corners and said separate groove form conical faces converging against the groove at a narrow slit angle; and an outer ring of an elastomeric material fitted into said separate groove.

2. Combination seal according to claim 1, characterised in that the intermediate ring is shaped at the said corners with bevelled, conical, annular faces.

3. Combination seal according to claim 1, characterised in that the said slit angle measures from 1° to 5°.

4. Combination seal according to claim 2, characterised in that the said slit angle measures from 1° to 5°.

* * * * *